(12) United States Patent
Jeong (10) Patent No.: US 7,156,460 B2
(45) Date of Patent: Jan. 2, 2007

(54) LOCKING DEVICE FOR DOUBLE FOLDING OF A VEHICLE SEAT

(75) Inventor: Chan Ho Jeong, Seoul (KR)

(73) Assignee: Kia Motors Corporation, Seoul (KR)

( * ) Notice: Subject to any disclaimer, the term of this patent is extended or adjusted under 35 U.S.C. 154(b) by 61 days.

(21) Appl. No.: 11/010,799

(22) Filed: Dec. 13, 2004

(65) Prior Publication Data

US 2005/0236883 A1    Oct. 27, 2005

(30) Foreign Application Priority Data

Apr. 27, 2004    (KR) ............. 10-2004-0028884

(51) Int. Cl.
*B60N 2/02*    (2006.01)
(52) U.S. Cl. ............ 297/336; 297/335; 297/331; 296/65.01; 296/65.03
(58) Field of Classification Search ........... 297/335, 297/336, 331; 296/65.03, 65.05, 65.01
See application file for complete search history.

(56) References Cited

U.S. PATENT DOCUMENTS 5,975,611 A * 11/1999 Hoshihara et al. ....... 296/65.03
6,196,610 B1 * 3/2001 Pesta et al. ............... 296/65.03
6,375,246 B1 * 4/2002 Nicola et al. ............. 296/65.03
6,520,581 B1 * 2/2003 Tame ........................ 297/336
6,655,738 B1 * 12/2003 Kammerer ................. 297/331
2002/0125753 A1 * 9/2002 Kammerer ................. 297/331
2003/0030312 A1 * 2/2003 Habedank ................. 297/335
2005/0062326 A1 * 3/2005 Kim et al. ................. 297/344.1

FOREIGN PATENT DOCUMENTS

JP        2003-118452        4/2003

* cited by examiner

*Primary Examiner*—Peter M. Cuomo
*Assistant Examiner*—Sarah B. McPartlin
(74) *Attorney, Agent, or Firm*—Morgan Lewis & Bockius LLP

(57) ABSTRACT

The locking device provides for double folding of a detachable vehicle seat, and in particular provides for double folding of a detachable vehicle seat capable of achieving an easier engaging and disengaging of a double folding detachable vehicle seat by providing a stopper and a strap for an unlocking operation of the stopper.

5 Claims, 12 Drawing Sheets

LOCKING DEVICE FOR DOUBLE FOLDING OF A VEHICLE SEAT

CROSS-REFERENCE TO RELATED APPLICATIONS

This application claims priority of Korean Application No. 10-2004-0028884, filed on Apr. 27, 2004, the disclosure of which is incorporated fully herein by reference.

FIELD OF THE INVENTION

The present invention relates to a locking device for double folding of a detachable vehicle seat, and in particular to a locking device for double folding of a detachable vehicle seat capable of achieving an easier engaging and disengaging of a double folding detachable vehicle seat by providing a stopper and a strap for an unlocking operation of the stopper.

BACKGROUND OF THE INVENTION

In general, multipurpose vehicles are provided with detachable rear seats in the second or third row so that they can be easily converted and used to meet a vehicle owner's need such as for freight storing space or passenger space when required. The detachable seat can be easily removed from the floor panel of a vehicle when there is a need for more room in a vehicle for loading large freight. Generally, a locking device is provided in a lower side of the seat for engaging or disengaging the detachable seat to the floor of a vehicle.

The design of these detachable seats places emphasis on the ease of engaging/disengaging the seat and the safety of a user while performing such.

In general, it is necessary that the double-folding type seats of all kinds of vehicles, including a detachable seat which is enabled to be double-folded due to the use of the locking device, be fixed after it is double-folded. Namely, an appropriate device is needed for fixing the seat in a double-folded state. If the seat is not locked in the double-folded state, the seat may vibrate or move, thus generating noise or damaging parts of the seat through impact.

SUMMARY OF THE INVENTION

Embodiments of the present invention provide a locking device for double folding of a detachable vehicle seat that addresses the problems encountered in the conventional art.

The present invention provides a locking device for double folding of a detachable vehicle seat that is capable of effectively preventing the movement of a seat during a vehicle operation, and enhancing a connection operation as compared to a conventional art in which a strap is wound over a seat and connected to a headrest frame of a front seat. The invention also provides a good look by installing the locking device in a lower side of a seat wherein the locking device includes a stopper capable of locking and supporting a seat between a main bracket of a front end locking part of a lower side of a seat and a leg frame, and a strap provided for an unlocking operation of the stopper.

There is provided a locking device for double folding of a detachable vehicle seat, comprising a front end locking part of a locking device installed in a lower side of a detachable seat for a vehicle. A seat lower side leg frame is installed in the locking part and is rotatable in both forward and backward directions and is operable with respect to a lower side engaging part engaged to a main bracket. A rod shaped stopper is rotatable in both forward and backward directions in an inner side of the leg frame and locks and supports the seat between the main bracket and the leg frame. A supporting bracket is installed in an inner surface of the leg frame for locking in the side of the leg frame of the stopper and is fixed in such a manner that an insertion part of the upper side of the forwardly rotated stopper is inserted into the supporting bracket in a state that the seat is double-folded. A release strap backwardly pulls the stopper of the unlocking state separated from the supporting bracket during the backward pulling operation.

A connection rod is provided to connect two stoppers of the front end locking part on the left and right sides. The release strap is connected with the connection rod. When the release strap is backwardly pulled, two stoppers of the front end locking part on the left and right sides are concurrently pulled through the connection rod.

A return spring having an elastic recovery force for a forwardly-directed rotation of the stopper is installed between the engaging part of the stopper and a main bracket hinge pin connected with the engaging part so that the rear side of the leg frame is lifted up for the double folding of the seat, and the stopper is elastically rotated in the forward direction.

An insertion part of the stopper is bent in a direction from a front side of the stopper and to a rear side of the same whereby the insertion part is inserted into the supporting bracket from the front side to the rear side after the stopper is elastically rotated forward. The bent angle is determined in such a manner that the stopper is forwardly rotated by an elastic recovery force of the return spring by an operation that the set of the folded state is forwardly tilted for the unlocking of the stopper, and the insertion part is automatically forwardly escaped from the supporting bracket.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

The preferred embodiments of the present invention will be described with reference to the accompanying drawings.

The present invention relates to a locking device for double folding of a detachable vehicle seat capable of enhancing an external appearance and handling during a double folding by providing a locking structure in a lower side of a seat in order to improve a conventional structure in which a strap is connected to a headrest of a front seat after a seat is double-folded.

Figure 5A:
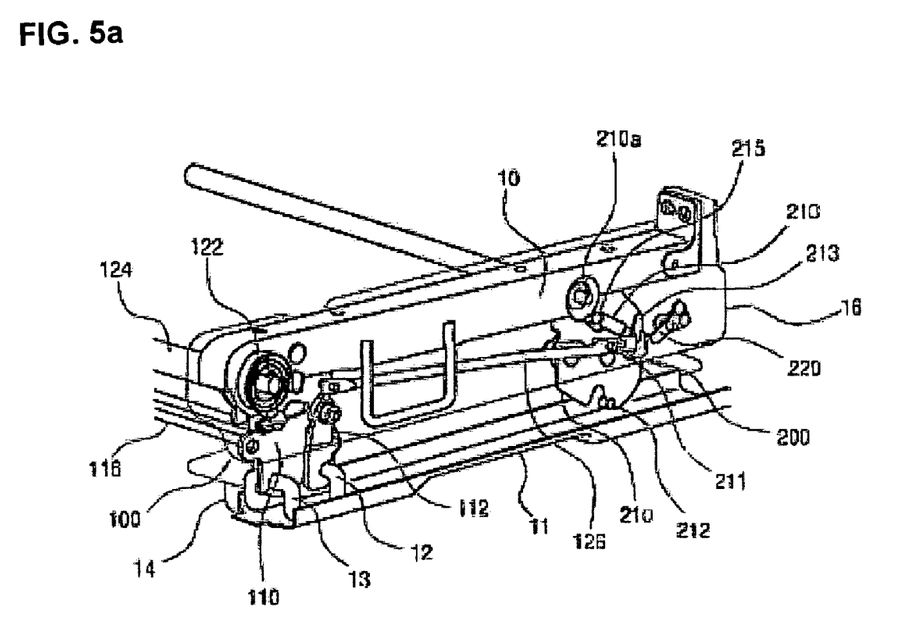
FIGS. 5A and 5B are perspective views illustrating a locking device which enables a double folding of a seat according to the present invention.
Figure 5B:
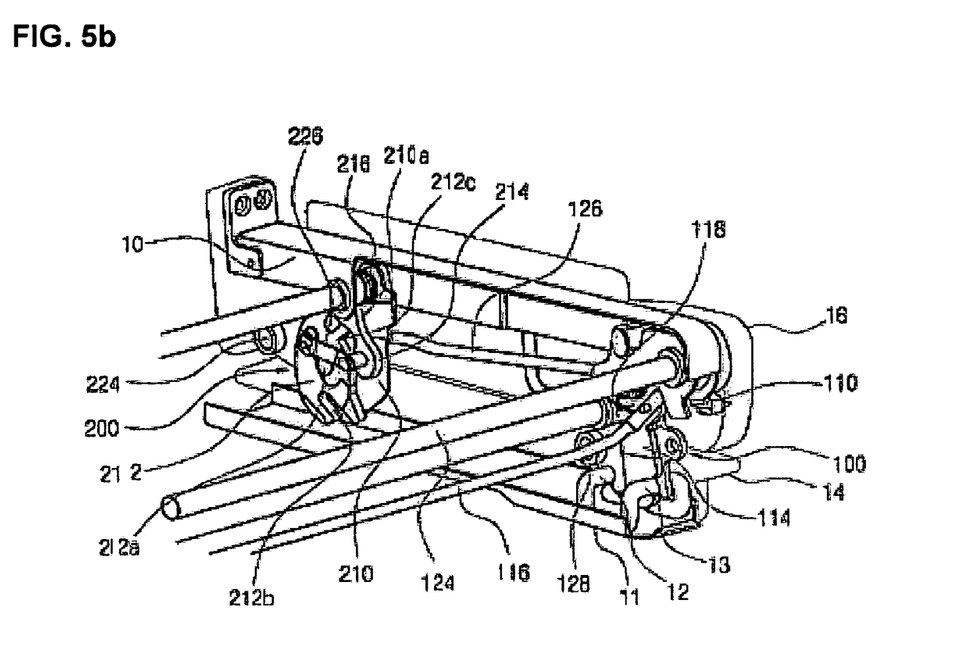
Figure 5C:
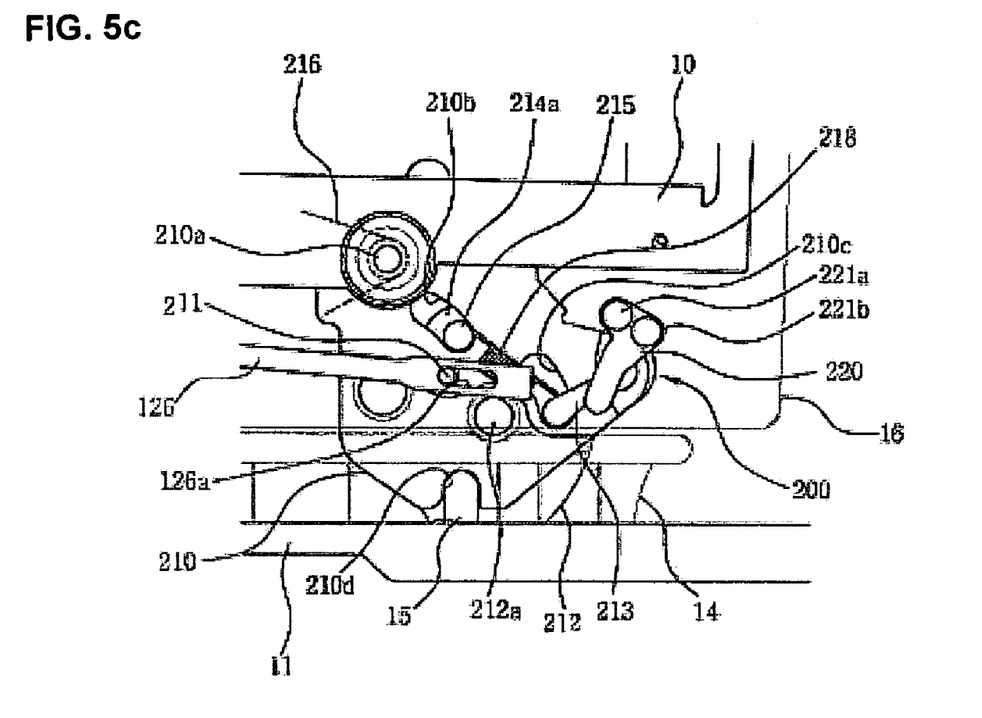
FIG. 5C is a lateral view illustrating a construction that a rear end locking part is enlarged in a locking device of FIG. 5A according to the present invention.

The locking device according to the present invention is basically designed to be adapted to the locking device invented and filed by the same inventor and applicant of the present invention (Korean patent application No. 2003-78837) and which is incorporated herein by reference. As shown in FIGS. 5A and 5C, a locking device comprises front and rear end locking parts 100 and 200, which respectively comprise main brackets 110 and 210, each of which, being engaged with strikers 12, 13, and 15, is independently installed at front and rear ends of a leg frame 10 in a lower side of the seat thereby supporting the leg frame, and is selectively locked/unlocked to a striker by lock plates 112, 114 and 212; and a spring member 122 that provides an elastic recovery force so that the leg frame 10 is rotated in a double-folded state with respect to the front end locking part 100 when unlocking the rear end locking part 200 in a state that the front end locking part 100 is fixed to the strikers 12 and 13.

In the above locking device, the locking procedure of the front end locking device 100 consists of two locking steps: a locking step of the first lock plate 112 and a locking step of the second lock plate 114. Namely, the user rotates a rear side of the seat downwardly and presses the seat so that the striker 15 is inserted into a main bracket recess 212d of the rear end locking part 200, so that the locking of the rear end locking part 200 is achieved.

In the above locking device, the lock plates 112 and 114 fully catch the strikers 12 and 13 for the locking in the rear and front sides of the seat for thereby achieving a stable locking state. In particular, all locking procedures of the front end and rear end locking parts 100 and 200 are performed based on the steps that the user pushes the seat with respect to the roller 128 in the direction of the striker cover 14 fixed to the vehicle body floor panel and makes the rear side of the seat stand upright and that the rear side of the seat is rotated downwardly and then is pressed for achieving a very simple and easy engagement of the seat.

According to the locking device, the double-folded state is achieved in a state that the rear side of the seat stands upright after the locking of the front end locking part 100 is performed or in a state that the rear side of the seat is automatically lifted up by an elastic recovery force of the spring member 122 after the rear end locking part 200 is unlocked.

Figure 6:
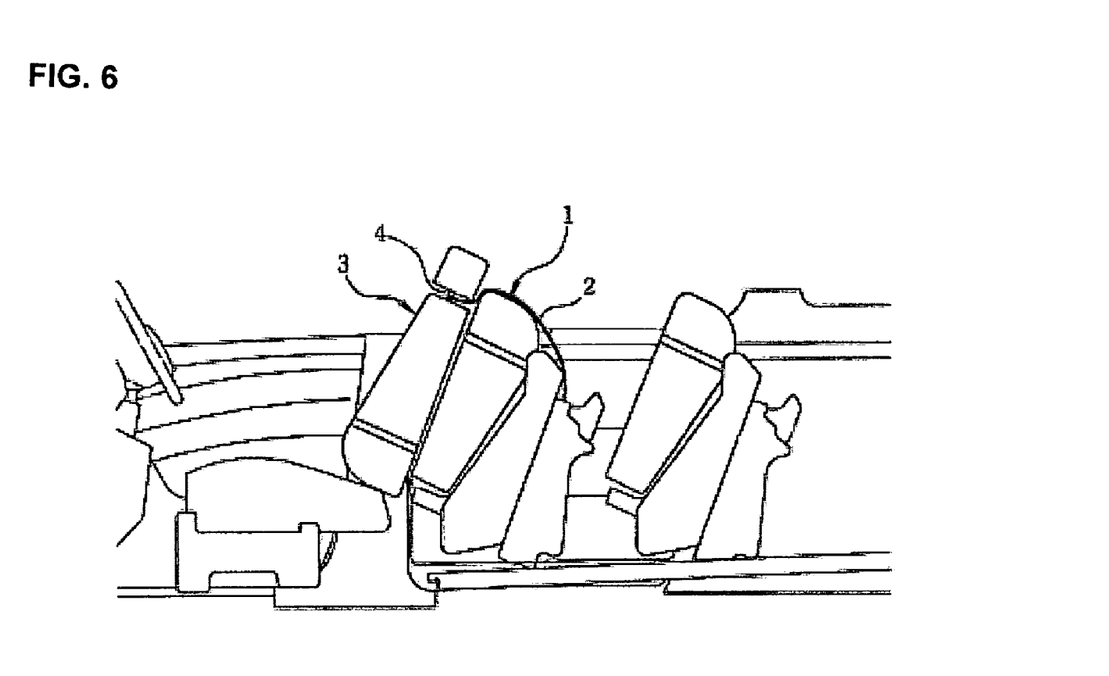
FIG. 6 is a schematic view illustrating a state that a seat is fixed based on a double folding method using a strap in a double folding seat.

In addition, there is provided a state indication part in the rear end locking part 200 in which the final locking is performed when engaging a seat for indicating the locking or unlocking state through the indication hole of the leg cover 16, installed in the outside of the leg frame 120 in cooperation with the rotation of the lock plate 212, so that it is possible to visibly check whether or not the locking device is completely locked through the indication bracket 220. In the double-folding seat, as shown in FIG. 6, in order to prevent the movement of the seat and fix the seat 1 in the double-folded state, a strap 2 is engaged in a lower side of the seat cushion and is caught by a headrest frame 4 of the front seat 3. However, in the structure where the seat is fixed by connecting the strap 2 to the headrest frame 4 of the front seat 3, the outer look is bad because the strap 2 is wound over the double folding seat 2. In addition, when engaging or disengaging the double-folded state of the seat, it is not easy to engage or disengage the strap 2 from the front seat 3.

The construction of the locking device according to the present invention will be described with reference to the accompanying drawings.

Figure 1:
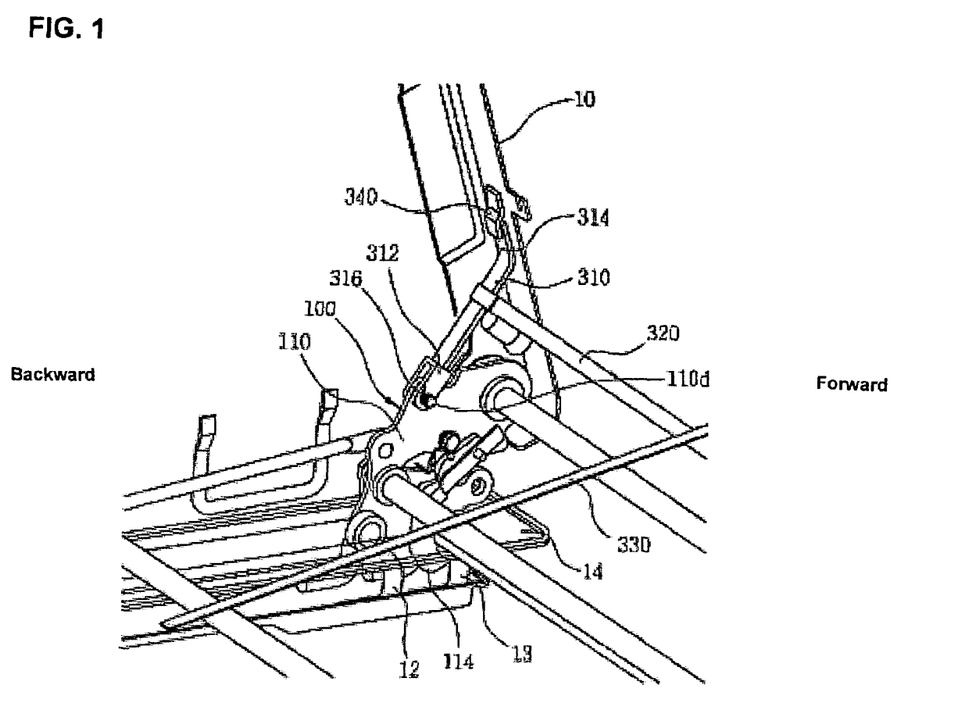
FIG. 1 is a perspective view illustrating a state where a locking device according to the present invention is installed.

FIG. 1 is a perspective view illustrating a state where a locking device according to the present invention is installed. As shown therein, a double folding is achieved by a locking device according to the present invention in a state that a rear side of a seat is lifted up after a front end locking part 100 is locked. FIG. 1 is a view from an inner side of a leg frame.

The locking device for double folding of a detachable vehicle seat according to the present invention is installed in each front end locking part 100 of the left and right sides that maintains a locking state with respect to strikers 12 and 13 during a double folding in a locking device that is symmetrically installed in the left and right sides of a lower side of a detachable seat for a vehicle.

The locking device according to the present invention includes a stopper 310 capable of locking and supporting a seat in a double-folded state between a main bracket 110 of each front end locking part 100 and each leg frame 10 of the left and right sides in a lower side of the seat. The stopper 310 is formed in a rod shape and is rotatable both forwardly and backwardly in an inner side of the leg frame 10 with respect to a lower end engaging part 312 hinged to an upper side of each main bracket 110.

The stopper 310 is longitudinally formed and has a U-shaped engaging part 312. An upper engaging portion of the main bracket 110 is inwardly inserted into the engaging part 312. A hinge pin 110d formed in an upper engaging portion of the main bracket 110 is inserted into an engaging hole (312a of FIG. 2A) of the engaging part 312, so that the stopper 310 is rotatable both forwardly and backwardly with respect to the rotation center of the hinge pin 110d.

Here, a return spring 316 is installed between the engaging part 312 of the stopper 310 and the hinge pin 110d of the main bracket 110. An elastic recovery force of the return spring 316 allows the rear side of the leg frame 10 to be lifted up and the stopper 310 to elastically rotate in the forward direction for double folding of a seat. The elastic recovery force of the same is applied in the direction that the stopper 310 is forwardly rotated (namely, based on forward and backward directions of a seat, clockwise direction of FIG. 1).

The stopper having the same structure as the above structure is symmetrically provided in the left and right sides in the main bracket that forms the front end locking part of the locking device (not shown) opposite to the seat. A connection bar 320 is installed between two stoppers 310 of the left and right sides of a seat. An end of the connection rod 320 is fixed at the stopper 310, and one end of a release strap 330 is installed at an intermediate portion of the connection rod 320. The release strap 330 is installed in such a manner that the stopper 310, which is in an unlocked state after being separated from a supporting bracket 340, is backwardly pulled when a user pulls the same backwardly while holding the other side.

The supporting bracket 340 is installed in an inner side of each leg frame 10 wherein one end of the same is inserted into the opposite side of the stopper 310 hinged to the main bracket 110 during the double folding, and the other end of the same is inserted for a locking operation at the side of the leg frame 10 of the left and right stoppers 310. The above supporting bracket 340 is installed symmetrically with the same structure both in the left and right sides in two leg frames 10, for thereby fixing a corresponding stopper 310, respectively.

An insertion part 314 is formed in an upper side of the stopper 310 wherein the insertion part 314 is bent at a certain angle in a backward direction so that it is inserted into an inner side of the supporting bracket 340 in the double-folded state of the seat after the stopper is elastically rotated in the forward direction. The insertion part 314 is inserted from the front side to the rear side of the supporting bracket 340. The bent angle of the insertion part 314 is determined so that the insertion part 314 is easily escaped from the interior of the supporting bracket 340 by slightly tilting the seat forwardly during the unlocking step of the double folding.

Figure 2A:
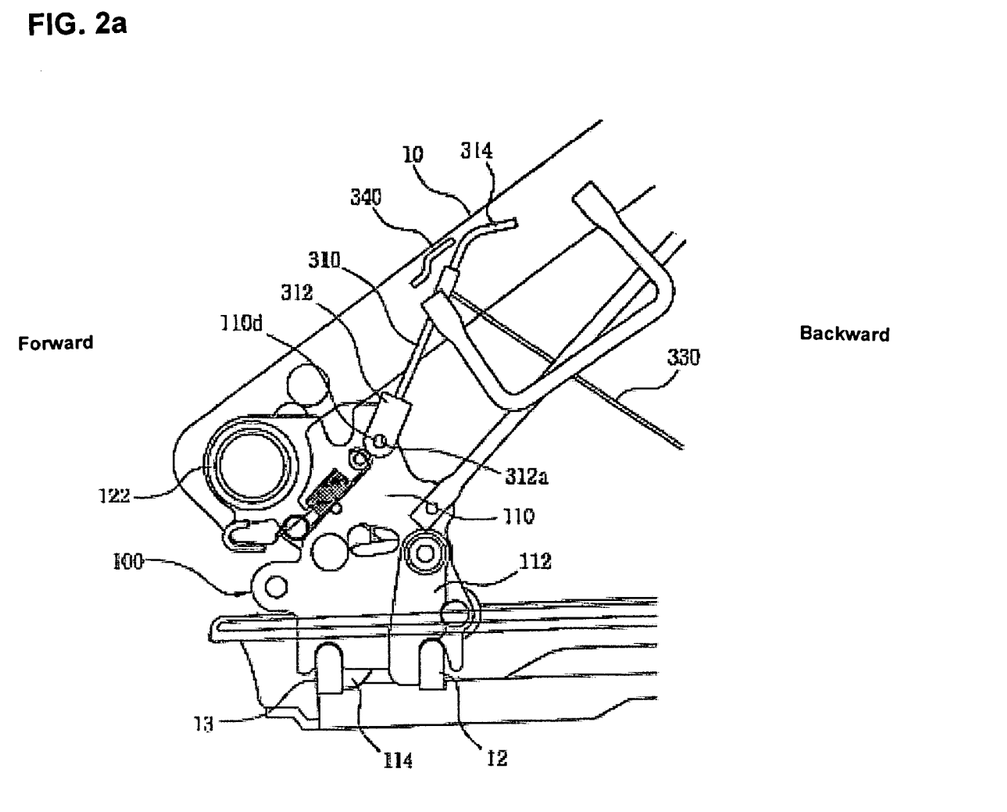
FIGS. 2A and 2B are lateral views illustrating a state where a double folding is being performed in a detachable seat adapting a locking device according to the present invention.
Figure 2B:
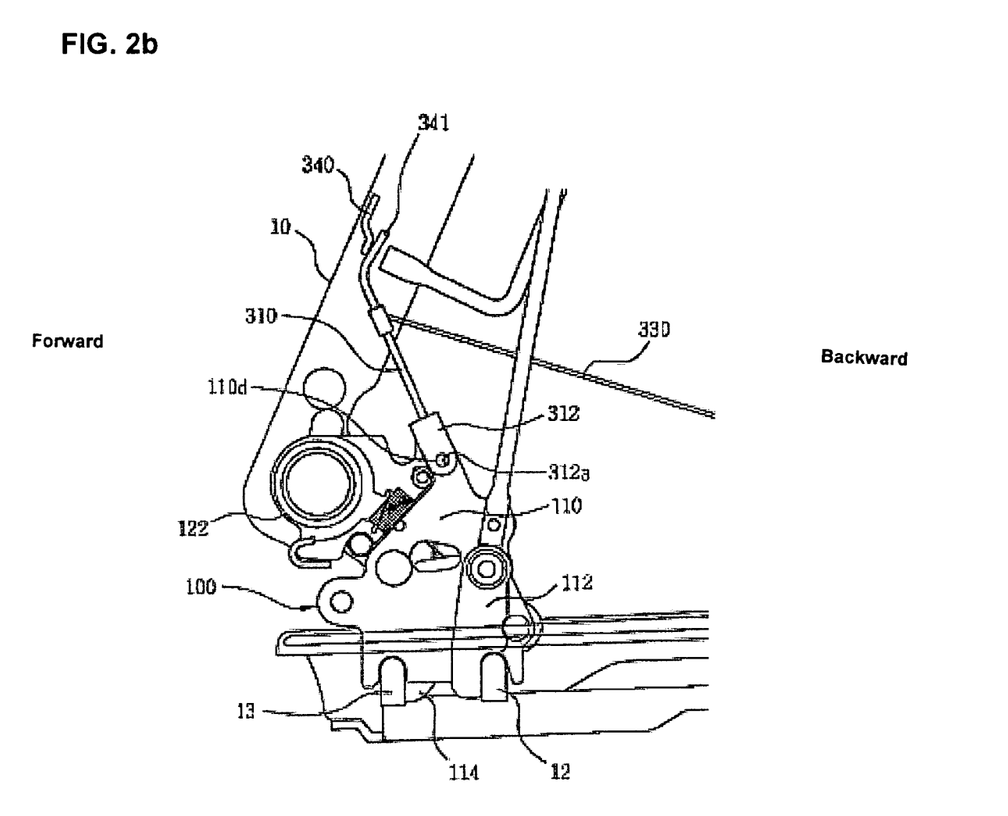

The operation of the present invention is described hereunder. FIGS. 2A and 2B are lateral views illustrating a state where a double folding is achieved in a detachable seat adapting a locking device according to the present invention. FIG. 1 is a view illustrating a state that a double folding of a seat is achieved through the procedures shown in FIGS. 2A and 2B.

As shown in FIG. 1, the stopper 310 locks and supports the seat in the double-folded state between the main bracket 110 of the front end locking part 100 and the leg fame 10. FIGS. 2A and 2B show the construction when viewed in the direction opposite to FIG. 1 and viewed from the outer side of the leg frame 10. As shown therein, the first lock plate 112 fully catches the first striker 12, and the second lock plate 114 fully catches the second striker 13. The locking operation of the front end locking part 100 has been achieved.

In the locking state of the front end locking part 100, the rear side of the seat is automatically lifted up by an elastic recovery force of the spring member, namely, the spiral spring 122, thus achieving the double-folded state. In the double-folded state, the freight storing space is expanded.

The procedure that the double-folded state is achieved by the locking device of the present invention is described. In the procedure that the rear side of the seat is lifted up, and the double-folded state is achieved, the stopper 310 is automatically rotated in the forward direction, namely, in the counterclockwise direction of FIGS. 2A and 2B by an elastic recovery force of the return spring 316, so that the insertion part 314 passes through the supporting bracket 340 of the inner side of the leg frame 10.

At this time, as the leg frame 10 is lifted up, and at the same time the insertion part 314 is moved along the upper inner side of the leg frame 10, the stopper 310 slightly rotates in the counterclockwise direction by the return spring 316. In a state that the seat stands fully upright, the insertion part 314 of the stopper 310 is inserted into the supporting bracket 340 of the leg frame 10, and the seat is stably fixed in the double folding stare as shown in FIG. 1.

In the locking device according to the present invention, the locking is achieved in a state that the insertion part 314 of the stopper 310 is inserted in the supporting bracket 340 of the leg frame 10. In the state that the locking is achieved, the stopper 310 of the left and right sides stably supports the leg frame 10 of the left and right sides of the double-folded seat in a state that it is fixed by the supporting bracket 340. Therefore, the movement of the seat is effectively prevented during the running of the vehicle, and the support strength is enhanced.

Figure 3A:
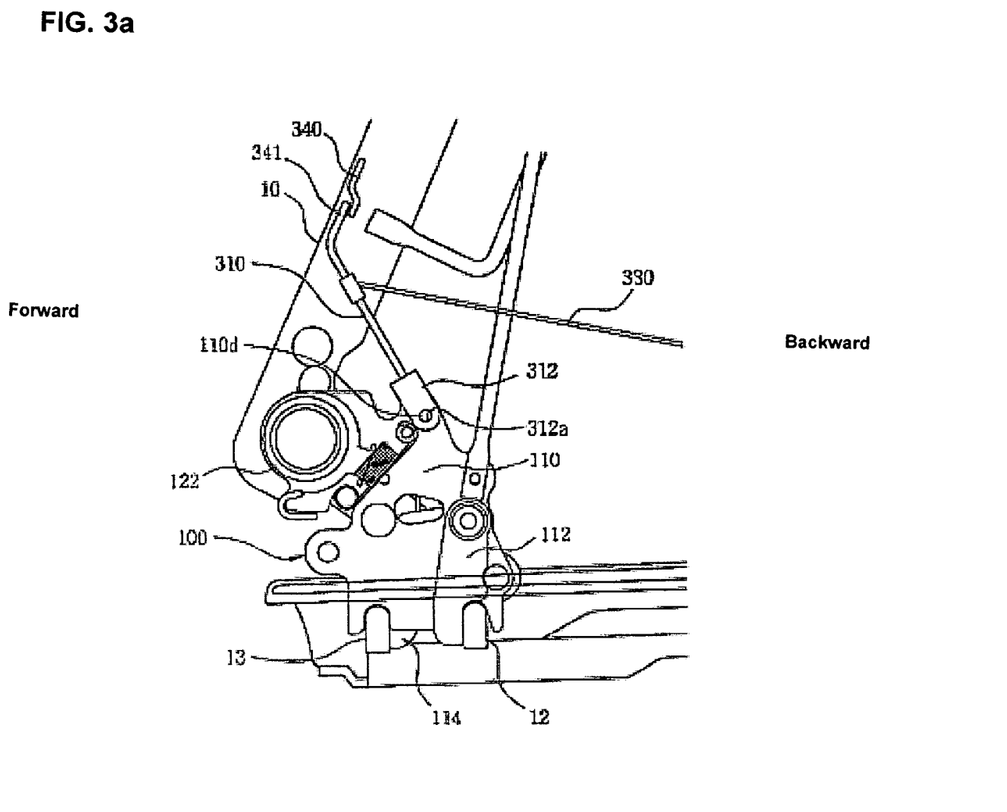
FIGS. 3A through 3D are lateral views illustrating a state where a locking device according to the present invention is unlocked.
Figure 3B:
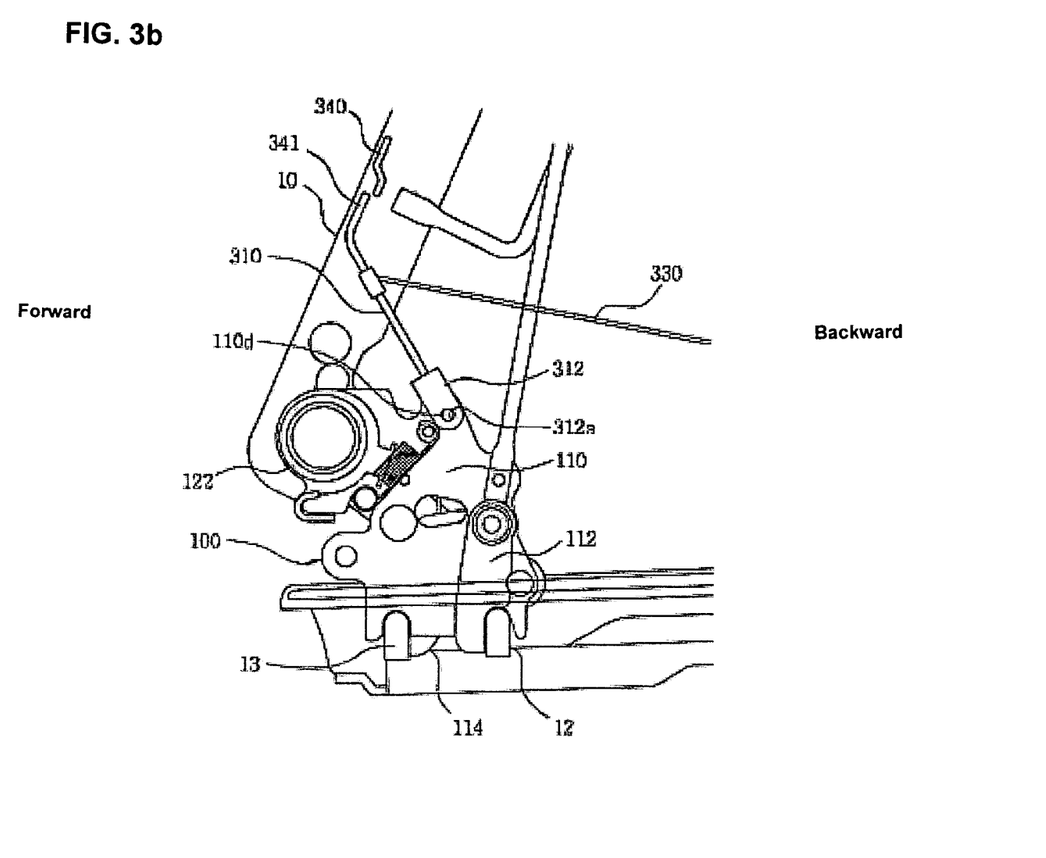
Figure 3C:
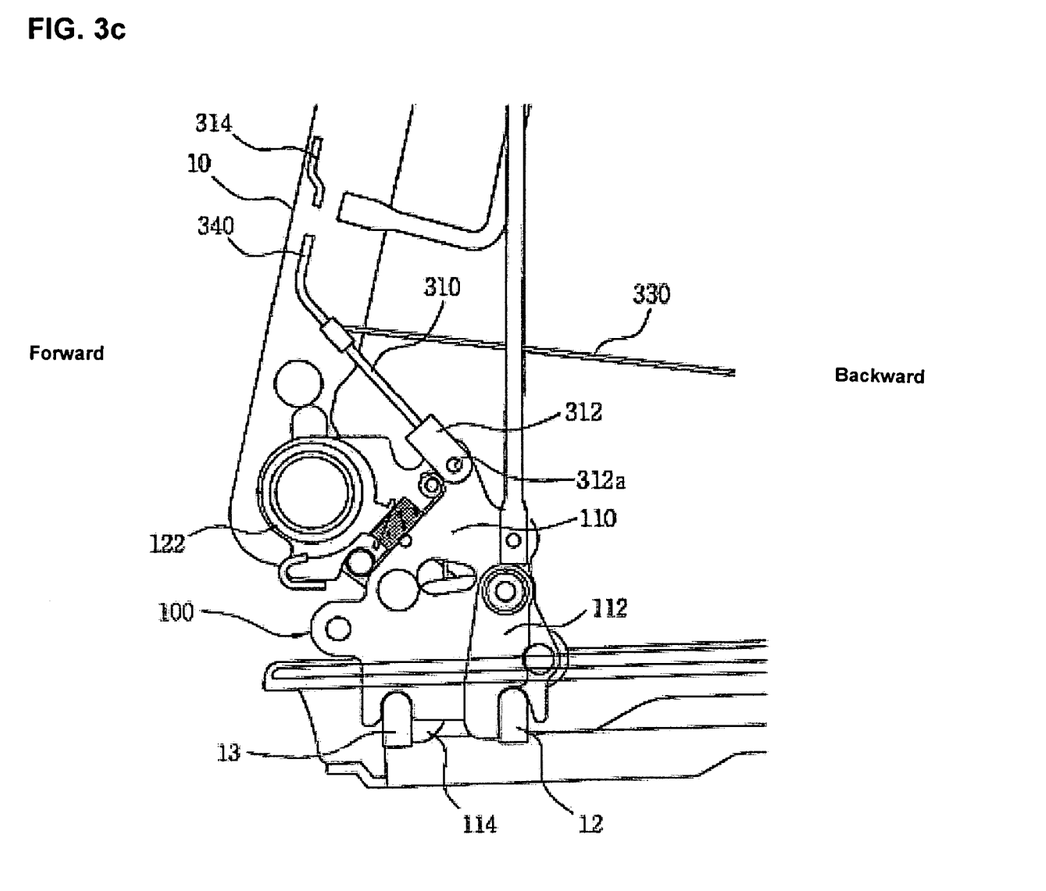

FIGS. 3A through 3D are lateral views illustrating a state where the locking device according to the present invention is unlocked. Namely, there is shown a lateral view viewed from the outer side of the leg frame 10. In a state that the locking is achieved as shown in FIG. 3A, when the seat is rotated at an angle of approximately 5° in the forward direction, the stopper 310 is slightly rotated by the elastic force of the return spring 316 in the forward direction, and the insertion portion 314 of the stopper 310 is escaped from the supporting bracket 340 of the leg frame 10.

Figure 3D:
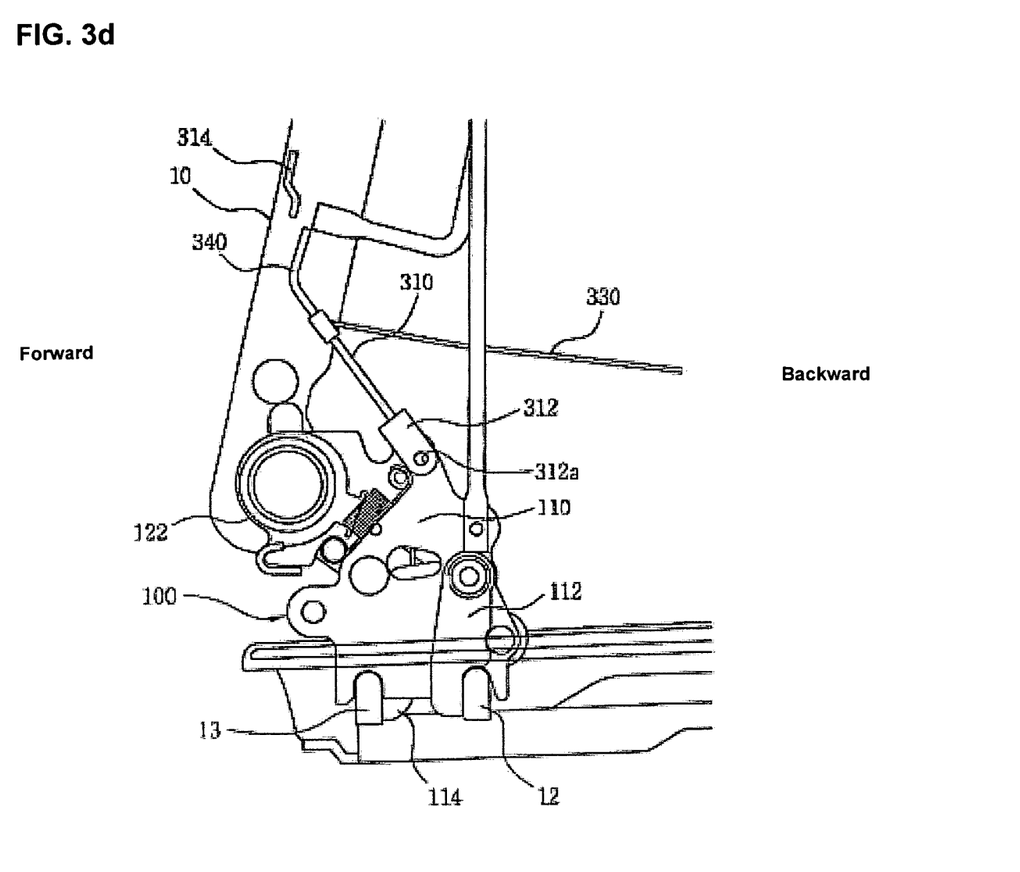

At this time, the user backwardly pulls the release strap 330 as shown in FIG. 3D, holding the same, the stopper 310 is fully escaped from the supporting bracket 340. The user rotates the rear side of the seat in the downward direction and presses so that the striker 15 is inserted into the bracket recess 212d of the rear end locking part 200, whereby the locking of the rear end locking part is achieved.

Figure 4:
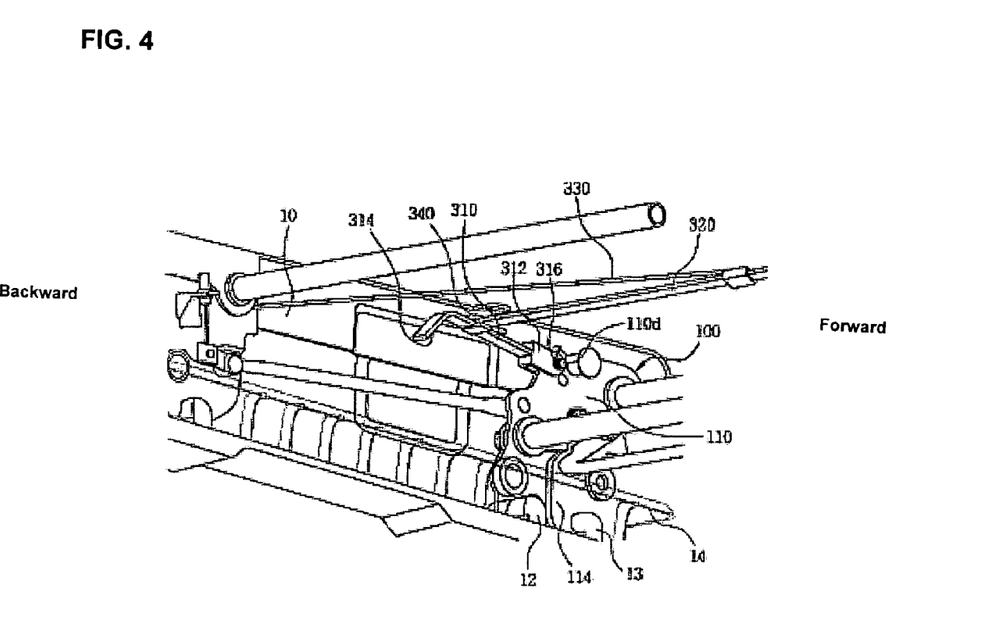
FIG. 4 is a perspective view illustrating a locking device according to the present invention in a state that a rear end locking part is locked.

FIG. 4 is a perspective view illustrating the locking device according to the present invention in a state that the locking of the rear end locking part is achieved, when viewed from the inner side of the leg frame 10.

As shown in FIG. 4, the locking of the rear end locking part 200 is completed after the double folding is released in a state that the seat is locked by the front end locking part 100, so that the full locking is performed at the front and rear ends with respect to the vehicle floor. Namely, the engagement of the seat is finished.

In the above state, even when the spring force of the return spring 316 is applied to the stopper 310, the stopper is caught by the upper inner surface of the leg frame 10, so that the forward rotation of the same is limited (rotation in clockwise direction).

As described above, according to the locking device for double folding of a detachable vehicle seat, in the locking state of the front end locking part, the seat is tilted forwardly, and the insertion part of the stopper is locked by inserting it into the supporting bracket of the leg frame, so that the stopper stably supports the double-folded seat in a fixed state by the supporting bracket. It is possible to effectively prevent the movement of the seat based on the double-folded fixing of the seat. Since the stopper stably supports the leg frame, the support strength is enhanced.

When the seat is slightly tilted in the forward direction, and the strap connected with the stopper through the connection rod is pulled, the insertion part is escaped from the supporting bracket, and the stopper overcomes the spring force of the return spring and is rotated in the backward direction, so that the double-folded fixing of the seat is released. Therefore, in the present invention, it is possible to more easily achieve and release the double-folded fixing of the seat based on a simple operation for thereby enhancing an easier handling as compared to the conventional art in which the strap is wound over the seat and is connected with the headrest frame. Since the operation of the stopper is performed in the lower side of the seat, a good outer look is achieved.

What is claimed is:

1. A locking device for double folding a detachable vehicle seat, comprising:
   a first front end locking part configured to removably couple with one or more strikers coupled to a vehicle body;
   a second front end locking part disposed opposite to said first front end locking part;
   a first leg frame rotatably coupled to said front end locking part;

a second leg frame disposed opposite to said first leg frame;

a first elongate stopper disposed between said first front end locking part and said first leg frame, wherein said first stopper comprises a first end and an opposing second end, wherein said first end is rotatably coupled to said first front end locking part;

a second elongate stopper disposed opposite to said first elongate stopper;

a first supporting bracket coupled to said first leg frame for removably coupling said second end of said first stopper to said first leg frame when the seat is double-folded;

a second supporting bracket disposed opposite to said first supporting bracket;

a connection rod that couples said first stopper to said second stopper; and a release strap coupled to said connection rod, such that in use said first stopper and said second stopper are simultaneously released from contact with said first supporting bracket and said second supporting bracket respectively when said release strap is pulled backward away from said front end locking parts.

2. The locking device of claim 1, further comprising at least one return spring configured to bias said second end of one of said stoppers toward a respective one of said leg frames.

3. The locking device of claim 2, wherein said return spring is coupled between said stopper and a respective one of said front end locking parts, such that when a rear side of said leg frame is lifted up for double folding of the seat said stopper is elastically rotated in a forward direction to engage with a respective one of said supporting brackets.

4. The locking device of claim 1, wherein said second end of at least one of said stoppers forms an insertion part that is bent in the backwards direction, wherein the insertion part releases from a respective one of said supporting brackets when a respective one of said leg frames is further rotated forward.

5. The locking device of claim 1, wherein at least one return spring having an elastic recovery force for a forwardly-directed rotation of one of said stoppers is installed between an engaging part of said stopper and a main bracket hinge pin connected with said engaging part, whereby the rear side of a respective one of said leg frames is lifted up for the double folding of the seat, and said stopper is elastically rotated in the forward direction.

* * * * *